United States Patent

[11] 3,595,110

[72] Inventors Walter E. Topliss
 Belgrave;
 Frederick Ellard, Thurmaston; David A. Harlow, Wigston Magna, all of, England
[21] Appl. No. 835,020
[22] Filed June 20, 1969
[45] Patented July 27, 1971
[73] Assignee Alfred Herbert Limited
 Foleshill Coventry, Warwickshire, England
[32] Priority Oct. 16, 1968
[33] Great Britain
[31] 49,030/68

[54] INDEXIBLE TURRET FOR A MACHINE TOOL
 6 Claims, 8 Drawing Figs.
[52] U.S. Cl. .................................................. 82/36 A, 74/813, 74/826
[51] Int. Cl. ............................................... B23b 29/28
[50] Field of Search .......................................... 82/36 A; 74/826, 813

[56] References Cited
UNITED STATES PATENTS
1,664,851 4/1928 Class ........................... 74/826 X
3,094,025 6/1963 Diener ........................... 82/36 A Primary Examiner—Leonidas Vlachos
Attorney—Mawhinney & Mawhinney ABSTRACT: A machine tool turret of the kind comprising a toolholder, a soleplate, an axially engageable coupling acting between the toolholder and the soleplate to locate the toolholder in an indexed position with respect to the soleplate, an indexing ring for effecting indexing of the toolholder from one indexed position to another, a cam turned by the indexing ring for effecting separation of said coupling to effect indexing of the toolholder and a shaft for turning the indexing ring. The turret also includes a nut engaged by said shaft and constrained to move axially thereon relatively to the soleplate on turning of the shaft, initial turning of the shaft in one direction moving said shaft axially of the nut to unclamp the toolholder by effecting separation of the indexing ring from engagement with a supporting surface therefor on the toolholder and continued turning of the shaft in said one direction effecting turning of the indexing ring, without further axial movement of the shaft, the nut instead of the shaft moving axially of the soleplate, axial separation of said coupling then occurring, followed, after indexing of the toolholder, to said other indexed position, by reengagement of said coupling and turning of the shaft in said other direction effecting axial movement of said nut followed finally by axial movement of the shaft and the indexing ring to reclamp the toolholder by reengaging the indexing ring with said supporting surface on the toolholder.

INDEXIBLE TURRET FOR A MACHINE TOOL

The invention relates to an indexible turret for a machine tool.

A manually indexible turret has been described in our copending U.S. Pat. application Ser. No. 633,192, filed Apr. 24, 1967 and now U.S. Pat. No. 3,449,990. In the turret described therein, the toolholder is held from axial movement with respect to the soleplate of the turret by a pair of spring-biased plungers which are retracted into sockets in the toolholder when indexing is taking place. Although the weight of the toolholder is taken by a spring before the plungers are retracted into their sockets, they are nevertheless subjected to some transverse loading axially of the turret and are therefore subject to wear. An object of the invention is to provide an alternative turret in which the plungers are not provided.

According to the invention, an indexible turret, for a machine tool, comprises a toolholder, a soleplate, axially engageable coupling means acting between the toolholder and the soleplate to locate the toolholder in an indexed position with respect to the soleplate, an indexing ring for effecting indexing of the toolholder from one indexed position to another, cam means arranged to be turned by the indexing ring for effecting separation of said coupling means to permit indexing of the toolholder, shaft means for turning the indexing ring, and a nut engaged by said shaft means and constrained to move axially of said shaft means relatively to the soleplate on turning of the shaft means, whereby initial turning of the shaft means in one direction will move the shaft means axially of the nut to unclamp the toolholder by effecting separation of the indexing ring from engagement with a supporting surface therefor on the toolholder and continued turning of the shaft means in said one direction will effect turning of the indexing ring, without further axial movement of the shaft means, the nut instead of the shaft means moving axially of the soleplate, whereby axial separation of said coupling means occurs, followed, after indexing of the toolholder, to said other indexed position, by reengagement of said coupling means, and whereby turning of the shaft means in said other direction will effect axial movement of said nut followed finally by axial movement of the shaft means and the indexing ring to reclamp the toolholder by reengaging the indexing ring with said supporting surface on the toolholder.

Conveniently, the shaft means carriers a stop which, when the toolholder is clamped by the indexing ring, is spaced by a small gap from a face of the soleplate, the stop being movable into engagement with the face on the soleplate to close the gap during the aforesaid initial turning of the shaft means in said one direction.

The supporting surface which is engaged by the indexing ring to effect clamping of the toolholder is conveniently provided on at least one pin extending from the toolholder and cooperable with one of a plurality of slots in the indexing ring and each corresponding to an indexed position.

Preferably, the coupling means is a toothed coupling of which each coupling part has a multiplicity of circumferentially spaced teeth.

The turret conveniently includes one-way clutch means between the toolholder and the soleplate to prevent turning of the toolholder in a direction opposite to that of indexing.

The turret may be arranged to be indexed manually or by power-operable means.

By way of example, a manually indexible turret for a machine tool is now described with reference to the accompanying drawings, in which.

Figure 1:
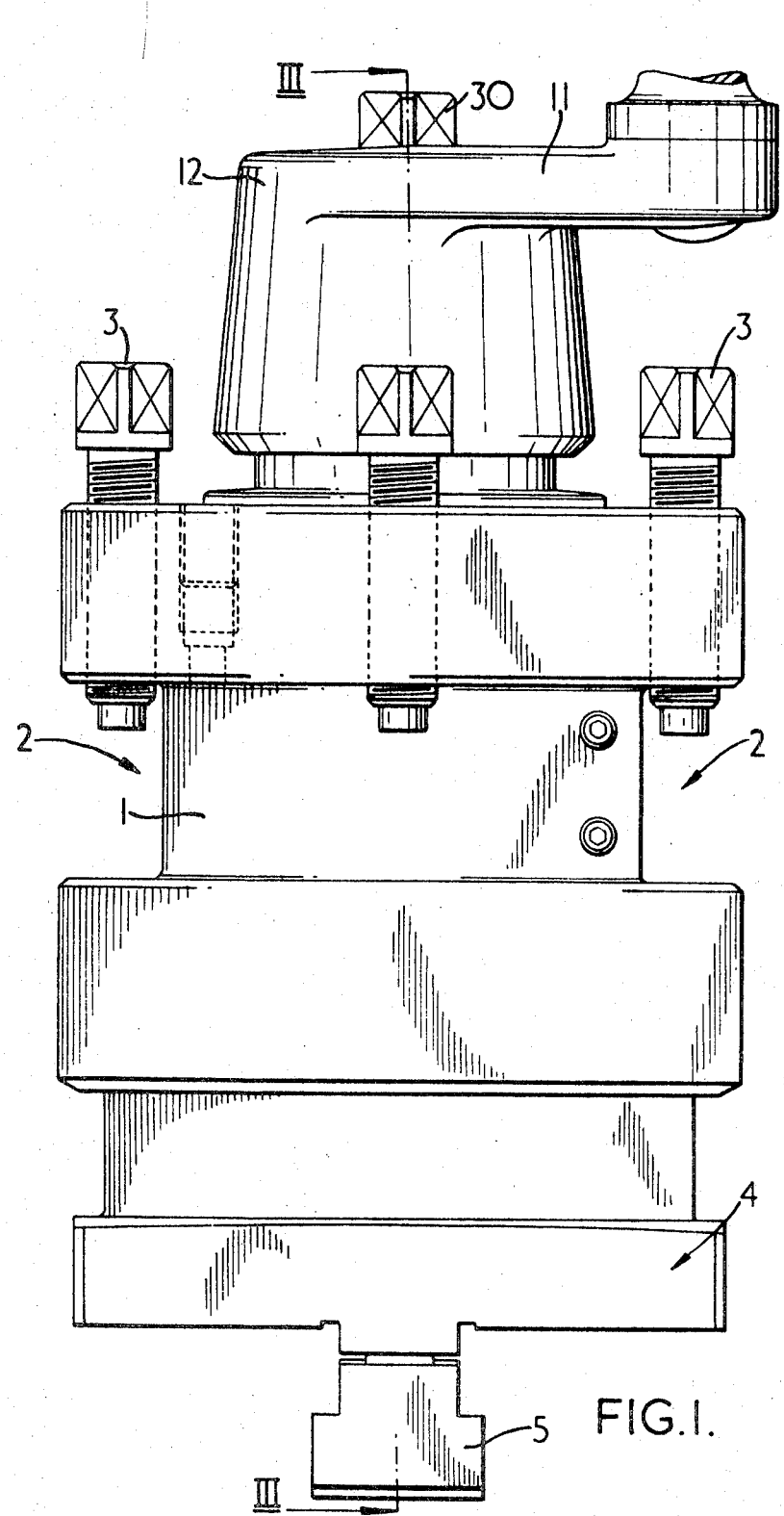
FIG. 1 is a side elevation of the turret.
Figure 2:
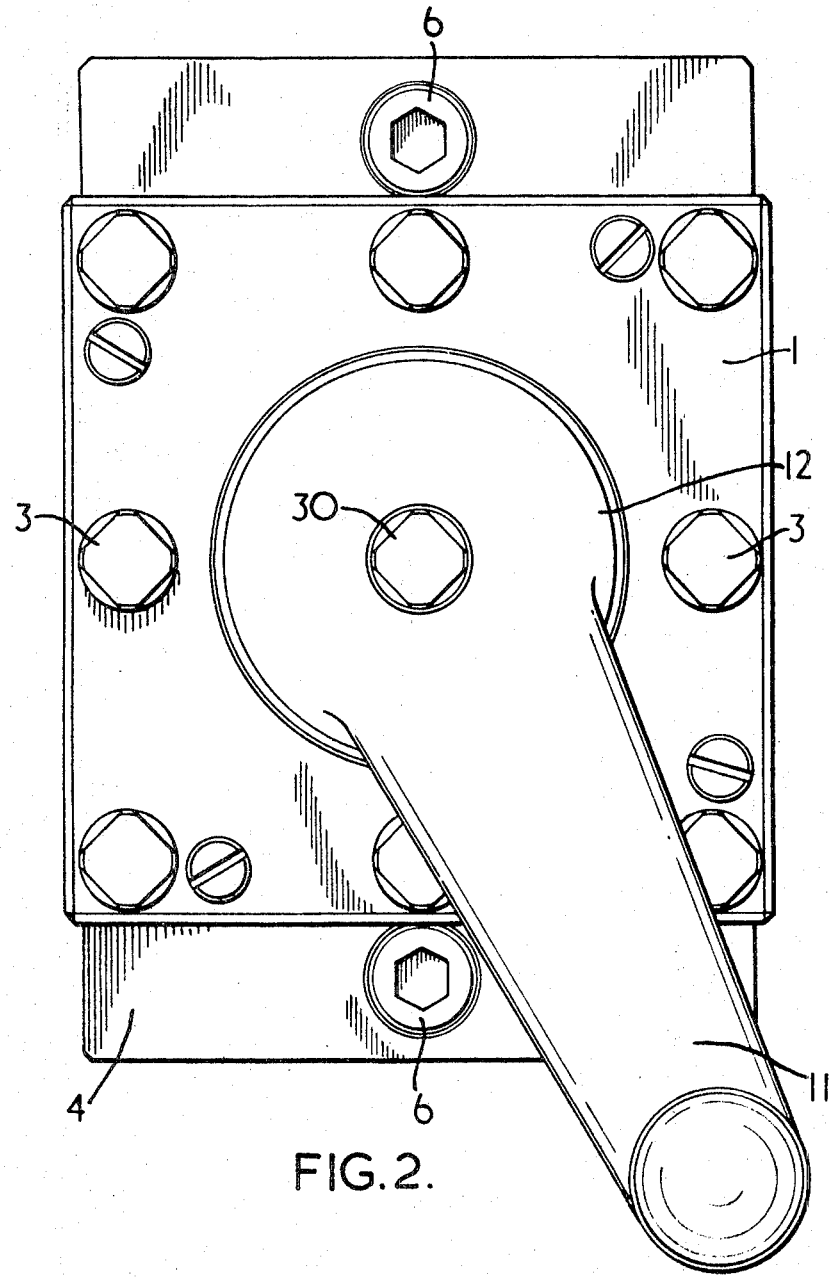
FIG. 2 is a corresponding plan view.
Figure 3:
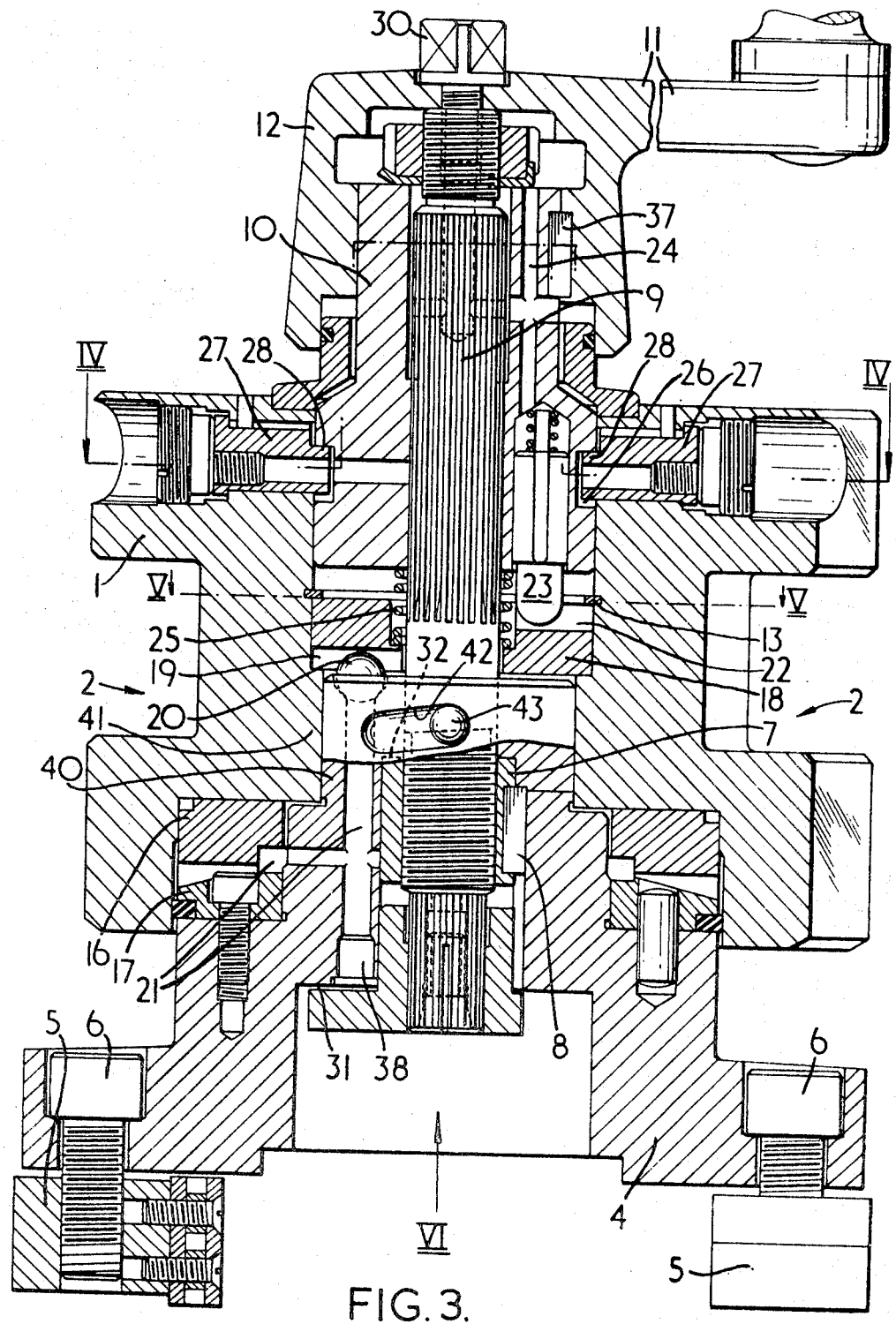
FIG. 3 is a general section of the turret on the line III—III in FIG. 1, except for the section of the toolholder thereof, which is taken on the line X—X in FIG. 4.
Figure 6:
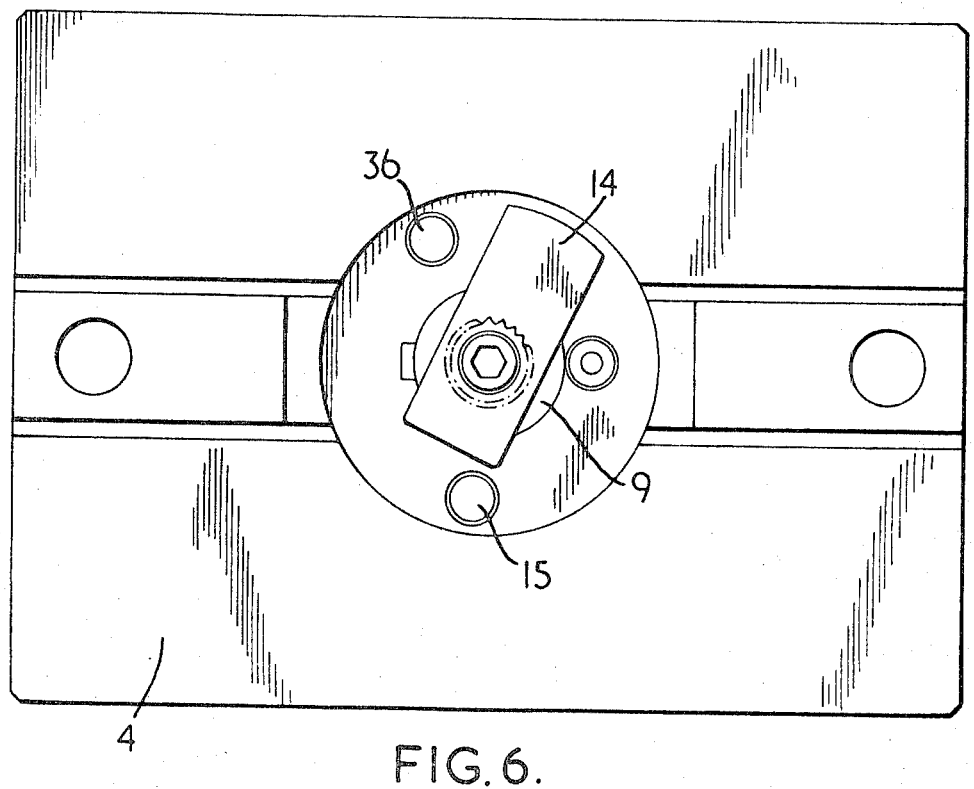
FIG. 6 is a view in the direction of arrow VI in FIG. 3, except for the omission of mounting T-blocks shown therein.

Referring particularly to FIGS. 1 to 3, the turret comprises a four-sided toolholder 1 having four lateral channels 2 in which tools are arranged to be held by screws 3. The holder 1 is mounted on a rectangular soleplate 4 which is mounted on a machine tool slide by means of T-blocks 5 supported by screws 6 from the soleplate and engaging in undercut slots in the slide. The soleplate 4 has a tubular extension 40 at its upper end which supports coaxially a cylindrical sleevelike portion 41 of the toolholder. The tubular extension 40 of the soleplate 4 has in its outer surface an elongate wedging-slot 42 containing a ball 43 engageable with the inner cylindrical surface of the sleevelike portion 41 and forming a one-way clutch device permitting rotation of the toolholder 1 in the anticlockwise direction around the tubular extension 40 but preventing rotation in the clockwise direction. The slot 42 is inclined downwardly from right to left as viewed in FIG. 3 so that the ball 42 will tend to be urged by gravity into a position in which it will be wedged between the radially inner surface of the slot and the inner cylindrical surface of the sleevelike portion 41 when an attempt is made to turn the latter in the clockwise direction. The soleplate 4 also has a central throughway containing a nut 7 held against rotation in the throughway by means of a key 8 but arranged to slide upwardly and downwardly in a portion of the throughway. In screw-threaded engagement with the nut 7 there is an upright shaft 9 supported by the soleplate 4 and having splined thereto an indexing ring 10 in the form of a tubular sleeve. The upper end of the shaft 9 carries an operating handle 11 secured thereto by a screw 30 and having a depending skirt 12 coaxial with the indexing ring 10. The indexing ring 10 and the handle 11 are keyed together by key 37. The lower end of the shaft 9 carries a stopblock 14, arranged to be turned with the shaft about its axis and engageable with a stop pin 15 (shown in FIG. 6) carried by the soleplate 4 to limit the angle of turning of the shaft 9 about its axis, as will hereinafter be explained. The toolholder 1 carries on a downwardly facing shoulder thereon one part 16 of a toothed coupling of which the other part 17 is mounted on an opposite upwardly facing shoulder on the soleplate 4. Each part of the coupling has a multiplicity of circumferentially spaced teeth. Except when the tool holder 1 is being indexed, the coupling parts 16 and 17 are engaged and the toolholder 1 is angularly secured. Also its weight is carried by the soleplate 4 through the interengaged coupling parts 16 and 17. The toolholder 1 is lifted to disengage the coupling parts 16 and 17 by a cam plate 18 coaxial with the shaft 9 and rotatable thereon within the toolholder 1. The cam plate 18 is positioned between an upper end face of the soleplate 4 and the lower end face of the indexing ring 10 and its upper face abuts against a circlip 13 secured on the toolholder. The cam ring 18 has in its lower face three equiangularly spaced, straight-sided slots 19, extending between the inner and outer peripheries of the ring 18 and each engageable with one of three balls 20 mounted on the upper end face of the soleplate 4. The upper end face of the cam plate 18 has therein three equiangularly spaced, straight-sided slots 22 substantially similar in shape to the slots 19 and angularly staggered with respect thereto. The slots 22 are engageable by a plunger 23 carried by the indexing ring 10. The indexing ring 10 has a circumferential groove 26 in its outer circumferential surface in which are located end portions 28 of a pair of diametrically opposite pins 27 secured in lateral sockets in the toolholder 1. The groove 26 has four equiangularly spaced slots 29 (shown in FIG. 4) communicating therewith for receiving the end portions 28 of the pins 27 during indexing, as will hereinafter be explained.

The internal parts of the turret are lubricated by removing handle clamping screw 30 and introducing lubricant through passages 24. Passage 21 in the soleplate 4 allows trapped air to be released through a breather 38 when the coupling parts 16, 17 are reengaged.

The operation of the turret to effect an indexing movement will now be described. The turret is shown in FIG. 3 in a clamped position. In this position, the toolholder 1 is angularly secured to the soleplate 4 by the interengaging coupling parts 16 and 17 and its weight is carried by the soleplate 4 through the interengaged coupling parts 16 and 17. Also the indexing ring 10 is clamped against the upper faces of the end portions 28 of the pins 27. As shown in FIG. 3, there is a small clearance gap 31 between an underneath face of the soleplate 4 and the upper surface of the stopblock 14. The toolholder 1 is unclamped by turning the handle 11 in an anticlockwise direction as viewed in FIGS. 2 and 4 from the position shown in FIG. 3. The first part of the anticlockwise movement of the handle 11 turns the indexing ring 10, the stopblock 14 and the shaft 9 with respect to the nut 7 which is in its upper position, as shown in FIG. 3, in engagement with a shoulder 32 of the soleplate. The shaft will therefore turn in the nut 7 and will rise slightly until the gap 31 has been closed. This slight upward movement of the shaft 9 will permit the indexing ring 10 to be lifted from bearing downwardly against the end portions 28 of the pins 27 by the upward thrust of a spring 25, thereby relieving downward force on the pins 27 and also, because the stopblock 14 bears against the underneath surface of the soleplate 4, relieving the downward force on the nut 7.

Continuing anticlockwise movement of the handle 11 will bring the lower end of the plunger 23 which is located in a slot 22 in the upper face of the cam ring 18 into contact with a side face 33 of the slot 22. During this movement, the shaft 9 cannot move upwardly any further as the stop block 14 is in contact with the soleplate 4 and therefore instead, the nut 7 will move downwardly on the shaft 9, as it is held from turning by the key 8.

Continuing anticlockwise movement of the handle 11 will turn the cam plate 18 by means of the plunger 23 turned by the indexing ring 10 until a ramplike face 34 of each slot 19 has moved to engage the corresponding ball 20 carried on the soleplate 4. When this occurs one pair of slots 29 in the indexing ring 10 are approximately in the correct angular positions to register with the end portions 28 of the pins 27. Up to this stage, the toolholder 1 has not moved as the coupling parts 16, 17 are still in engagement.

Continuing anticlockwise movement of the handle 11, will move the cam plate 18 by means of the plunger 23. This has the result that the cam plate 18 will ride over the balls 20, thereby lifting the cam plate 18 which in turn lifts the toolholder 1 by engagement of the cam plate 18 with the circlip 13, thereby disengaging the coupling parts 16 and 17 and also lifting the end portions 28 of the pins 27 into the pair of slots 29 with which they are in axial registration.

Continuing anticlockwise movement of the handle 11 through 90° will cause the toolholder 1 to be indexed through 90°. The handle 11 and the shaft 9 cannot be turned any further in the anticlockwise direction because the stopblock 14 will then be in contact with the stop pin 15 in the soleplate 4. Also each slot 19 will then be positioned above one of the balls 20, thereby allowing the cam plate 18 and the toolholder 1 to fall under the weight of the toolholder 1, thereby reengaging the coupling parts 16 and 17. Also the end portions 28 of the pins 27 will have reentered the circumferential groove 26 in the indexing ring 10. While the toolholder 1 is in its raised position in which the coupling parts 16 and 17 are disengaged it cannot be turned in the clockwise direction due to the wedging action of the ball 43 in the slot 42, as hereinbefore described. Therefore it is not possible to reverse the direction of turning of the toolholder 1 once indexing has commenced and furthermore the indexing sequences cannot be performed out of phase.

Having indexed the toolholder 1, the turret then has to be reclamped. This is performed by turning the handle 11 in the clockwise direction. During this movement, the lower end of the plunger 23 will move up a sloping side face 35 of the slot 22 in which said plunger end is located, in the manner of a ratchet, without turning the cam ring 18. The shaft 9 will turn, but as the nut 7 is clear of the shoulder 32 on the soleplate 4, the nut 7 will travel upwardly until it has reengaged the shoulder 32. Continuing clockwise movement of the handle 11 will cause the toolholder 1 to be reclamped as the shaft 9 and the indexing ring 10 will move downwardly relatively to the nut 7. The upper faces of the end portions 28 of the pins 27 are then reengaged by a corresponding face of the indexing ring 10, thereby effecting clamping of the turret. The gap 31 between the stopblock 14 and the soleplate 4 as shown in FIG. 3 is also reformed.

The turret can again be indexed by turning the toolholder 1 through a further 90°, by repeating the above-described unclamping, indexing and reclamping operations.

Figure 4:
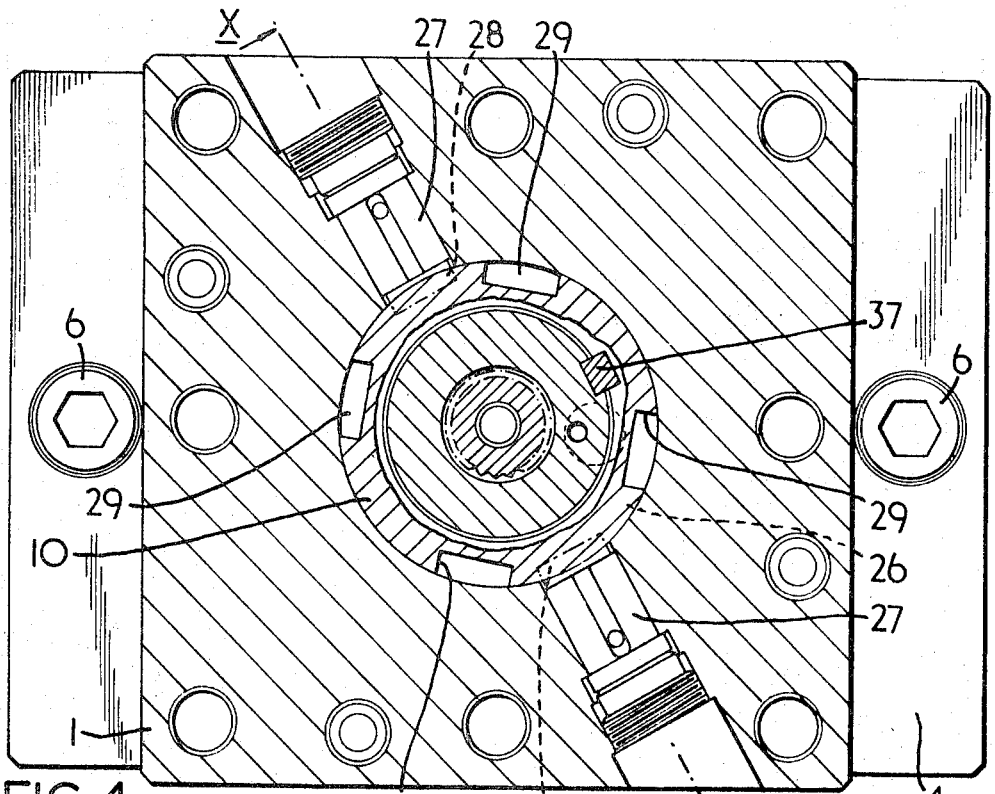
FIG. 4 is a section on the line IV—IV in FIG. 3.
Figure 5:
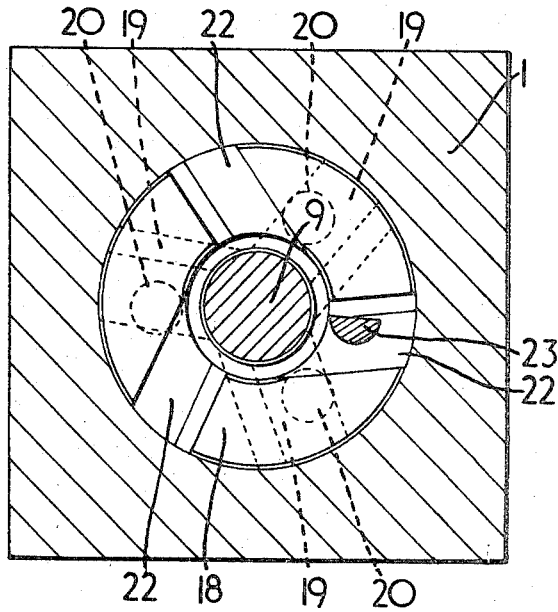
FIG. 5 is a section on the line V—V in FIG. 3.
Figure 7:
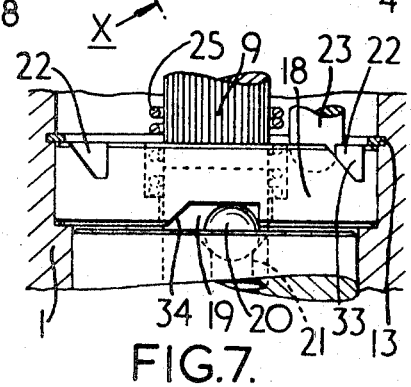
FIGS. 7 and 8 are diagrams showing respectively side views of the lower and upper faces of a cam plate also shown in FIGS. 3 and 5.
Figure 8:
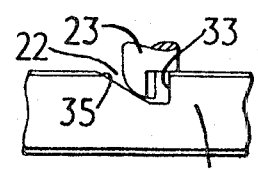

As a result of wear on the clamping faces of the end portions 28 of the pins 27 and/or extension of the screw-threaded parts of the shaft 9 and the nut 7, it would be possible, except for a stop pin 36 (see FIG. 6) provided on the soleplate 4, for the indexing ring 10 to move too far in the clockwise direction, as shown in FIG. 4, and thereby reduce the effective clamping area of the indexing ring on the end portions 28 of the pins 27. By providing the stop pin 36, it will, when maximum allowable wear has taken place, be engaged by the stopblock 14, thereby limiting the clockwise movement of the indexing ring and indicating to the user that readjustment to compensate for the wear has become necessary.

Although in the foregoing example, the turret is of the manually operable kind, it could be indexed by any equivalent power-operable device, for example, an electrical or fluid-operated motor arranged to turn the shaft 9 by means of a gear drive.

Although the toolholder 1 is square and has four indexing positions arranged 90° apart, it could be of another shape having a smaller or greater number of indexing positions.

What we claim as our invention and desire to secure by Letters Patent of the United States is:

1. An indexible turret, for a machine tool, comprising a toolholder, a soleplate, axially engageable coupling means acting between the toolholder and the soleplate to locate the toolholder in an indexed position with respect to the soleplate, an indexing ring for effecting indexing of the toolholder from one indexed position to another, said indexing ring being movable axially of the toolholder into and out of engagement with a supporting surface therefor on said toolholder, a cam to be turned by the indexing ring for effecting separation of said coupling means to permit indexing of the toolholder, a screw-threaded shaft for turning the indexing ring, means for turning said shaft about its axis, a nut carried by said shaft, means constraining said nut to move axially of said shaft relatively to the soleplate on turning of said shaft, and a stop carried by said shaft and spaced from a locating face on said soleplate when said coupling means are engaged and said indexing ring is in engagement with said supporting surface therefor on said toolholder such that commencing with said stop initially spaced from the locating face on said soleplate, turning of the shaft in one direction will effect axial movement of the shaft relatively to the nut to unclamp the toolholder by separation of the indexing ring from said supporting surface therefor until the stop engages said locating face on said soleplate when continued turning of the shaft in the same direction will effect turning of the indexing ring and the cam to effect axial separation of said coupling means, followed by indexing of said toolholder and reengagement of the coupling means and turning of the shaft in the opposite direction until the stop has been moved away from said locating face on said soleplate will reclamp said toolholder by reengagement of said indexing ring with said supporting surface therefor.

2. A turret as claimed in claim 1 including at least one pin extending from said toolholder and cooperable with one of a plurality of slots in said indexing ring and each corresponding to an indexed position, said pin providing said supporting surface engaged by said indexing ring to effect clamping of said toolholder.

3. A turret as claimed in claim 1 in which said coupling means is a toothed coupling of which each coupling part has a multiplicity of circumferentially spaced teeth.

4. A turret as claimed in claim 1 in which one-way clutch means are provided between said toolholder and said soleplate.

5. A turret as claimed in claim 1 in which the turret has handle means for manual indexing.

6. A turret as claimed in claim 1 in which said toolholder has four indexing positions arranged at 90° angular intervals around the axis of the turret.